United States Patent Office 2,752,015
Patented June 26, 1956

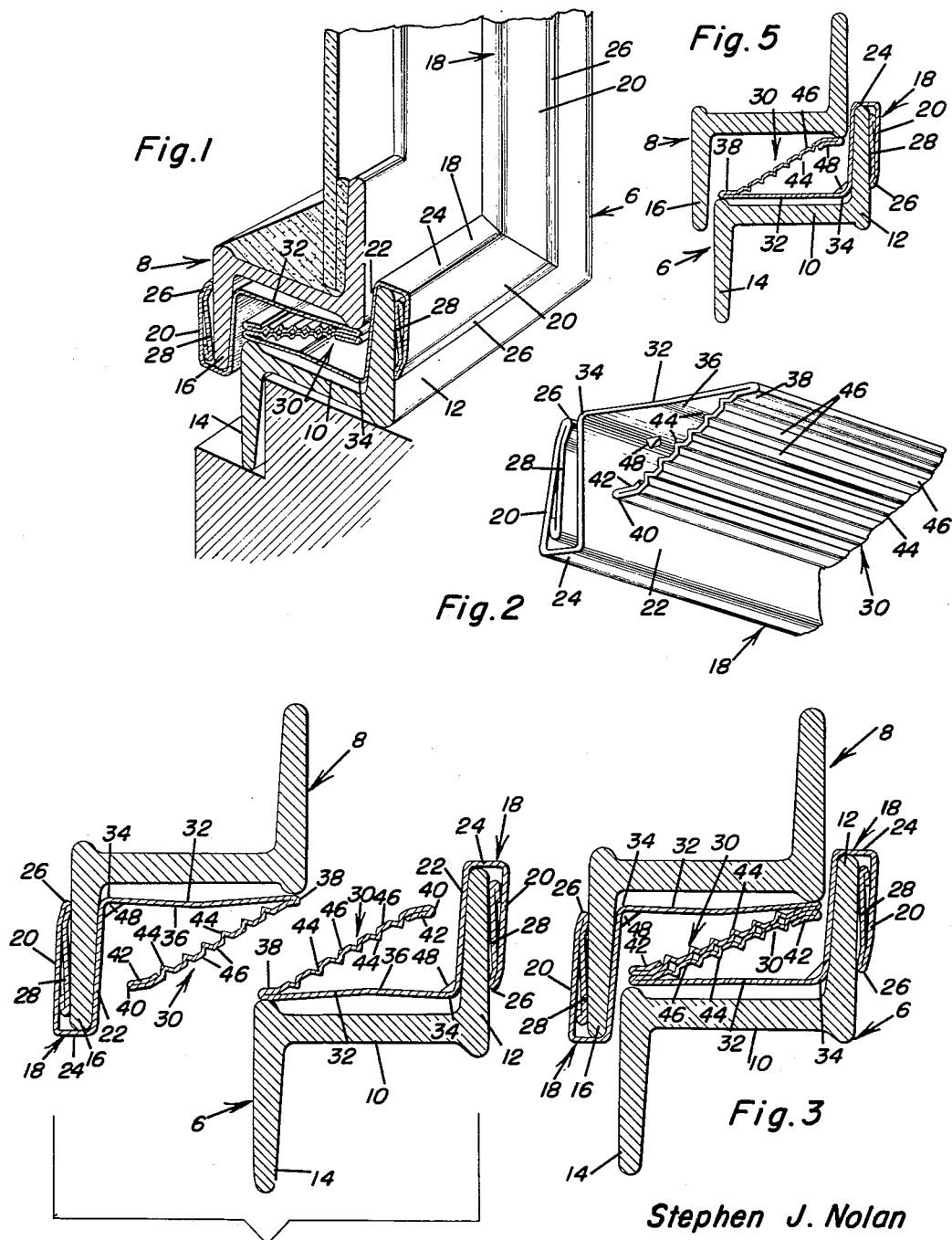

2,752,015

WEATHER STRIP FOR METAL CASEMENT WINDOWS

Stephen J. Nolan, Mount Vernon, N. Y.; Elizabeth Nolan, executrix of said Stephen J. Nolan, deceased Application October 23, 1953, Serial No. 387,879

2 Claims. (Cl. 189—65)

The present invention relates to metal weather strips which are especially, but not necessarily, adapted for use on and in association with metal and equivalent casement windows.

An object of the invention is to structurally, functionally, and otherwise improve upon similarly constructed and performing sheet metal weather strips and, in doing so, to thus provide a weather strip construction in which manufacturers, retailers, mechanics and users will find their essential and respective requirements and needs effectually met.

An equally important, and perhaps the principal object of the invention is to improve upon the weather strip construction disclosed in Patent 2,234,533, granted to me on March 11, 1941. While the patented weather strips are capable of being used singly between the casement frame and stationary window frame, they are generally used in paired or companionate relationship in the manner disclosed in the drawings of the stated patent. Thus, when the window is closed and the oblique-angled weather strips come into overlapping and mating contact, any buckling or defective areas caused by buckling and deformation from contraction, expansion, or distorted bending has resulted in a defective seal.

Confronted with the problem which has now been repeatedly met during formation and installation as well as prolonged use, a satisfactory solution of the problem has now been achieved by retaining the desired resiliency and flexibility of the weather strips, but strengthening the same to promote and insure the kind of seal which is needed.

In carrying out the principles of the instant invention, the channel-shaped friction-held anchoring clamp, positioning flange and oblique-angled flexibly resilient weather strip is retained. It follows that in reducing to practice the more finished structure desired, I now provide a weather strip construction which is applicable for ready use without requiring the use of headed fasteners such as screws, bolts, or the like, comprising an elongate clamp which channel-shaped in cross-section, is thus adapted to be saddled over said anchoring flange for retention thereon, said clamp embodying spaced walls joined by way of a connecting web, one wall having a yieldable lengthwise friction-retaining tongue extending into the channel portion and adapted to bear yieldingly against a coacting surface of said anchoring flange, a substantially rigid adapting and positioning flange having one edge joined with and extending at right angles from the free edge portion of the other wall of said clamp and adapted to parallel the aforementioned web, a resilient weather strip disposed at an oblique angle to and overlying said flange in spaced slanting relation and having one longitudinal edge portion joined to the adjacent other edge of the positioning flange by way of a firmly clenched return bend, the other longitudinal edge of the weather strip being free to flex toward and from said flange and being doubled upon itself to provide a reenforcing binder, said weather strip being corrugated and providing needed stability, whereby buckling and undesirable deformation is reduced to a minimum.

Then, too, novelty is predicated on the construction above revealed, wherein the corrugations are preferably V-shaped in cross section, constitute ribs, and have their vertices directed into the space existing between the flange and weather strip and wherein the portions between the open side of the ribs are flat webs and are coplanar with each other in order to provide an effective weather-shield when yieldingly stressed and pressed into mating contact with a correspondingly constructed companion weather strip.

Other objects, features, and advantages will become more readily apparent from the following description and the accompanying sheet of illustrative drawings.

In the drawings:

Figure 1 is a fragmentary perspective view of a casement window showing the improved weather strips, their construction and the manner in which they are anchored and mated for achievement of the desired seal;

Figure 2 is a fragmentary perspective view of a portion of one of the improved weather strip constructions;

Figure 3 is a sectional view, based on Figure 1, with the weather strips appearing in elevation;

Figure 4 is a similar view with the frames and weather strips separated and in readiness to swing into sealing relationship; and Figure 5 is a view like Figure 3 but showing a single weather strip construction and the manner in which it can, under certain circumstances, be used.

With reference first to Figure 1, the numeral 6 designates, generally, a stationary casement window frame, while the casement window, which is movable thereto, is denoted by the numeral 8. These are conventional in construction in that the frame 6, for example, is characterized by a horizontal web portion 10, having an upstanding lateral flange 12 and a depending lateral flange 14. The improved weather strip cooperates primarily with the flanges 10 and 12. The flange 12 and the corresponding flange 16 on the window frame is specifically mentioned here because it constitutes an anchoring or hold-down member for the attaching clamp of the weather strip construction.

The clamp is channel-shaped in cross-section and is denoted by the numeral 18 and comprises a first wall 20, second wall 22, and a connecting web 24. The free edge portion of the wall 20 is laterally toed in and fashioned into a return bend as at 26 and is provided with an extension tongue 28 which fits into the space of the channel and which is resilient and, in practice, is under tension and presses against the coacting surface of the hold-down flange 12. This clamp is saddled over the flange and thus provides the desired anchorage of the over-all weather strip construction. The weather strip per se is here denoted by the numeral 30 and it is connected to a positioning flange 32 which is, in turn, joined by a rounded bend at 34 to the free edge of the wall 22. The flange 32 extends at right angles to the wall and it is positioned in somewhat spaced parallelism to the web 10. The central portion may have a stabilizing bend, as at 36, if desired. A tight-clenched return bend 38 provides the connection between the weather strip and the positioning flange 32. The weather strip is approximately as wide as the flange 32 and is resilient and slants at the oblique angle approximately shown best in Figure 4. The free edge portion of the weather strip is doubled upon itself as at 40 and a reenforcing lip or binder is thus provided at 42. Thus, the respective longitudinal edges of the weather strip are firm. The portion therebetween instead of being smooth and flat throughout, as in Patent 2,234,533 is here improved by being corrugated. The corrugations constitute lengthwise ribs and are V-shaped in cross-section. It follows that the corrugations or ribs are in close-spaced parallelism and they are denoted by the numerals 44. The intervening flat portions between the respective corrugations form lands or flat web portions, as at 46, which are coplanar. Consequently, when the strips are applied in pairs, as shown in Figures 1, 3 and 4, and when they come into overlapping or mating contact, as best shown in Figure 3, the respective flat surfaces 46—46 bind nicely together and perfect a practical and efficient seal. It will be especially noted that the ridges or vertices of the respective ribs turn into the space between the weather strip 30 and the companion positioning flange 32. Hence the ribs do not nest into each other and there is no chance of the respective weather strips when paired, to interlock, and interfere with the opening and closing of the window 8. Also, in practice, the junctural bend 34 between the wall 22 and flange 32 is provided with indentations or extrusions at 48 which constitute additional reenforcing elements.

Compared with the prior Patent 2,234,533, the clamp is superior by extending wall 20 and having the toed-in returning bend 26 for security, and the reenforcing lip 42 is wider and the over-all weather strip 30 is improved by way of the added features 44 and 46.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use on either a casement window frame or a supporting frame therefor wherein said frame embodies a central web with a pair of lengthwise flanges extending from opposite lengthwise sides and at right angles to the plane of the web, and wherein one of said flanges presents itself as a practical and convenient clamp accommodation and anchoring member; a weather strip construction which is applicable for ready use without requiring the use of headed fasteners such as screws, bolts, or the like, comprising an elongate clamp which is channel-shaped in cross-section and which is thus adapted to be saddled over said anchoring flange for retention thereon, said clamp embodying spaced walls joined by way of a connecting web, one wall having a yieldable lengthwise friction retaining tongue extending into the channel portion and adapted to bear yieldingly against a coacting surface of said anchoring flange, a substantially rigid adapting and positioning flange having one edge joined with and extending at right angles from the free edge portion of the other wall of said clamp and adapted to parallel the aforementioned web, a resilient weather strip portion disposed at an oblique angle to and overlying said flange in spaced slanting relation and having one longitudinal edge portion joined to the adjacent other edge of the positioning flange by way of a firmly clenched return bend, the weather strip portion being corrugated and providing needed stability, whereby buckling and undesirable deformation is reduced to a minimum, the corrugations thus provided constituting close-spaced parallel lengthwise ribs, said ribs being individually distinct, V-shaped in cross-section with their vertices all on one and the same side of said weather strip portion, and directed into the space existing between the flange and said weather strip portion.

2. The structure defined in claim 1 and wherein there are web portions between the respective ribs, said web portions being flat and coplanar with each other and adapted to provide an effective weather seal when yieldingly stressed and pressed into mating metal-to-metal contact with a correspondingly constructed companion weather strip portion.

References Cited in the file of this patent
UNITED STATES PATENTS 1,584,309    Lane _____ May 11, 1926
2,234,533    Nolan _____ Mar. 11, 1941